Figure 1:
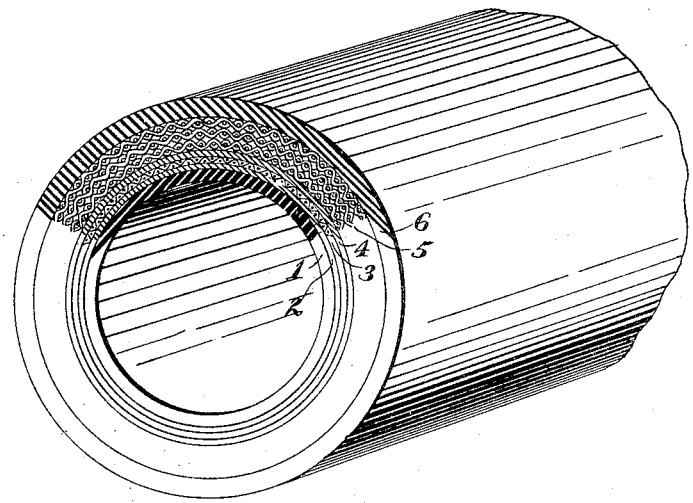

No. 798,137. PATENTED AUG. 29, 1905.
F. A. MAGOWAN.
AIR BRAKE HOSE.
APPLICATION FILED MAY 16, 1905.

WITNESSES:
William M. Hilbert
Albert Nathan

INVENTOR
Frank A. Magowan
BY
B. C. Stickney
ATTORNEY

UNITED STATES PATENT OFFICE.

FRANK A. MAGOWAN, OF TRENTON, NEW JERSEY.

AIR-BRAKE HOSE.

No. 798,137.     Specification of Letters Patent.     Patented Aug. 29, 1905.

Application filed May 16, 1905. Serial No. 260,635.

*To all whom it may concern:*

Be it known that I, FRANK A. MAGOWAN, a citizen of the United States, residing in Trenton, in the county of Mercer and State of New Jersey, have invented certain new and useful Improvements in Air-Brake Hose, of which the following is a specification.

This invention relates to flexible hose to be used in the air-brake systems of railroad-trains for making connections from car to car. Such hose is called upon to withstand a high bursting pressure and is constantly exposed to the weather and roughly handled. It is also constantly subjected to attacks from within, since oil is used freely in the pump which compresses the air, and this oil is blown through the system and gathers in the hose, particularly at the points where the hose is attached to the metal couplings. The oil eats away the rubber lining of the hose and, together with the moisture which is usually present, attacks the duck or similar fibrous material, which forms a constituent of the hose, and the duck rapidly mildews and deteriorates. The oil and moisture are drawn along the meshes of the duck by capillary attraction and cannot escape by evaporation, being imprisoned by the rubber. So it often happens that in a few days of use the hose is rendered worthless, since when the duck decays there is little or nothing to withstand the air-pressure. The hose then bursts, and the train is beyond the control of the engineer, often with disastrous results. It is thus necessary to renew the hose frequently, so as to guard against possibility of bursting from unseen and unknown deterioration of the duck. The life of the hose in use is thus limited to a few weeks. If it were not for the deleterious effects of the substances conveyed through the hose, it would endure many months or even years.

The object of my invention, therefore, is to prevent deterioration by the oils, acids, and moisture usually present in the hose when in use.

In carrying out my invention I employ, preferably, two tubes, one within the other, each consisting of woven or plaited wire or strips of copper or other suitable metal, preferably of fine mesh. Each of these tubes is capable of withstanding great bursting stress, and neither is affected by oil nor appreciably by either moisture or acid. Being woven in a suitable manner, preferably with all the wires winding helically, as in some kinds of fire-hose or in the jackets of gas-tubing, the metal tubes are flexible. When made of copper, moreover, they are incapable of bursting, since copper stretches considerably before breaking, and thus the hose will become swollen, thus showing at once to the trainman that the hose should be renewed, and hence safeguarding the brake system.

Within the inner woven-wire tube I place a lining of a suitable rubber compound proof against the action of oil and other deleterious substances. Such a compound preferably consists of rubber well charged with finely-powdered plumbago, although some other substances may be used. Between the woven-wire tubes I wind two or more layers of duck, so as to render the hose trebly safe and strong, and outside of the outer wire tube I place the usual rubber cover, which may be a compound of rubber possessing oil-proof qualities. The outer woven-wire tube may, however, be omitted. Both inner and outer wire tubes I combine with rubber in a manner to seal the duck absolutely against access of oil and the like. For this purpose I use pure caoutchouc—that is, caoutchouc or rubber which is uncombined with sulfur and which is in an uncured or unvulcanized or green state. In this condition the rubber is not only soft and pliable, but also sticky and proof against deleterious substances likely to gain access to the interior of the hose. A layer of this substance may be placed both within and without each of the woven-wire tubes, so that oil and other things are prevented from getting at the duck either by working out from the inside of the hose or by working in from the outside of the hose. Wrappings of "friction" may be used next to the wire, both inside and outside of each wire tube, between the same and the layer of caoutchouc.

Figure 2:
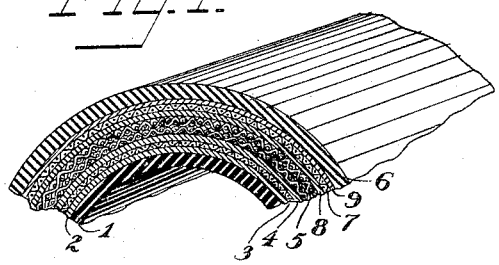
Figure 3:
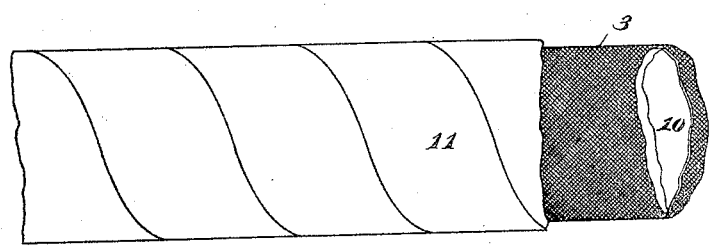

In the accompanying drawings, Figure 1 shows sectionally a piece of flexible air-brake hose made according to my invention with a single woven-wire tube. Fig. 2 is a segment of tube made in the preferred form with outer and inner woven-wire tubes and intervening plies of duck or the like. Fig. 3 illustrates the windings of "friction" or muslin charged with sticky rubber, whereby it is caused to adhere to contiguous layers.

Referring to Fig. 1, the inner tube 1 of the hose consists, preferably, of rubber loaded with plumbago and vulcanized and proof against deterioration by oil and the like. Upon this tube is placed a very thin layer 2 of unvulcanized or green rubber—that is, pure caoutchouc—and inclosing the latter is a tube 3, consisting, preferably, of woven copper wire of fine mesh, the strands running helically, as seen at Fig. 3. This tube may be made a trifle over size, so it will slip easily onto the layer 2, and then by stretching the wire tube endwise it is caused to contract permanently in diameter and to grip the inner layers or tubes. The wire, however, may be woven directly upon the layer 2. The wire tube is then covered with a very thin layer or coat of caoutchouc 4, similar to the layer 2, and over this may be wound several plies of duck 5, preferably three in number, giving extraordinary strength and security. Upon the duck may then be placed the usual cover 6 of a compound of rubber adapted to withstand attacks from oil, as well as rough usage and exposure to the weather.

It will be understood that all of the parts of the hose may be assembled and then the curing or vulcanizing may take place. In assembling the air is of course worked out from between all the plies or layers. The inner tube 1 or the cover 6 may, if desired, be partially cured before assembling. The heat incident to vulcanizing will not change the raw character of the caoutchouc layers 2 and 4, owing to their being uncombined with sulfur. Thus a hose is made having vulcanized, and hence tough, inner and outer tubes, both of which are proof against attacks from oil and possessing great stability and strength, while the duck is shielded from attacks of deleterious substances from within. The copper-wire tube diminishes but little, if any, the flexibility of the hose and, as already explained, cannot be burst and will withstand great bursting pressure even before stretching, while it is not liable to suffer from attacks of oil, acids, and moisture. The inner layer of caoutchouc, moreover, resists these deleterious substances and shields the wire tube, while both the caoutchouc layers and the wire tube itself shield the duck from such liquids, so that both the wire tube and the duck may be depended upon for an indefinite length of time when exposed to the severest conditions of use.

At Fig. 2 an outer copper-wire tube 7 is used between the duck-plies 5 (of which two only need be used) and the cover 6, thus producing hose of phenomenal strength and stability. Its position is such that it is inaccessible to oils and liquids from the interior of the hose, and it may be also protected both within and without by caoutchouc layers 8 and 9 similar to 2 and 4. If the cover 6 is cut by rough handling, the parts 7, 8, and 9 prevent oil or moisture entering into the cuts from gaining access to the duck.

As seen diagrammatically at Fig. 3, windings of "friction" muslin 10 and 11 may be applied both within and without the wire tubing 3, between the same and the caoutchouc, thus conducing to the stability of the structure, preventing the wire from cutting through the green caoutchouc, and affording a good base for the latter. It also renders it more feasible to slip on the copper-wire tube or to weave the same.

It will be understood that the usual metal couplings may be employed upon the hose and fastened in the hose in the usual manner.

Variations may be resorted to within the scope of the invention, and portions of my improvements may be used without others—as, for instance, one of the caoutchouc layers may be omitted from each of the metal tubes.

Having thus described my invention, I claim—

1. A flexible air-brake hose comprising an interior tube formed of an oil-proof compound of rubber and inclosed by a layer of caoutchouc, said layer inclosed by a woven-copper-wire tube of fine mesh upon which is an outside layer of caoutchouc, plies of duck wound upon the last-mentioned layer, a second woven-copper-wire tube of fine mesh inclosing said duck, and a suitable cover of oil-proof rubber.

2. A flexible air-brake hose comprising an interior tube formed of an oil-proof compound of rubber and inclosed by a layer of caoutchouc, said layer inclosed by windings of wire upon which is an outside layer of caoutchouc, plies of duck wound around the last-mentioned layer, and a suitable cover of rubber.

3. A flexible air-brake hose comprising an inner tube, windings of duck, a cover, and a layer of caoutchouc formed in the wall of the hose for preventing access of deleterious substances to the duck.

4. A flexible air-brake hose comprising an inner tube, windings of duck, a cover, and layers of caoutchouc inside and outside of the duck for preventing access of deleterious substances thereto; said layers formed between said tube and said cover.

5. A flexible air-brake hose comprising an interior oil-proof rubber tube, layers of caoutchouc and woven copper wire thereon, windings of duck upon said layers, layers of caoutchouc and woven copper wire upon said duck, and an oil-proof cover.

6. A flexible air-brake hose comprising an interior oil-proof rubber tube, a layer of caoutchouc thereon, windings of friction-muslin upon said caoutchouc, a woven-wire tube upon said muslin, windings of duck, and a cover.

7. A flexible air-brake hose comprising an interior oil-proof rubber tube, a layer of caoutchouc thereon, windings of friction-muslin upon said caoutchouc, a woven-copper-wire tube of fine mesh upon said muslin, windings of duck upon said wire tube, a layer of caoutchouc upon said duck, windings of friction-muslin upon the last-mentioned layer, a woven-copper-wire tube upon the last-mentioned muslin, and a suitable cover 8. A flexible air-brake hose comprising an interior oil-proof rubber tube, a layer of caoutchouc thereon, windings of friction-muslin upon said caoutchouc, a wire tube upon said muslin, a layer of caoutchouc upon said wire tube, windings of duck upon the last-mentioned layer, a layer of caoutchouc upon said duck, windings of friction-muslin upon the last-mentioned layer, a wire tube upon the last-mentioned muslin, a layer of caoutchouc upon the last-mentioned wire tube, and a suitable oil-proof cover.

FRANK A. MAGOWAN.

Witnesses:
B. C. STICKNEY,
WILLIAM M. HILBERT.